(12) United States Patent
Kuang

(10) Patent No.: US 11,140,652 B2
(45) Date of Patent: Oct. 5, 2021

(54) DATA PROCESSING METHOD AND APPARATUS

(71) Applicant: Huawei Technologies Co., Ltd., Shenzhen (CN)

(72) Inventor: Yunsheng Kuang, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 16/763,033

(22) PCT Filed: Nov. 24, 2017

(86) PCT No.: PCT/CN2017/112905
§ 371 (c)(1),
(2) Date: May 11, 2020

(87) PCT Pub. No.: WO2019/100334
PCT Pub. Date: May 31, 2019

(65) Prior Publication Data
US 2021/0195551 A1    Jun. 24, 2021

(51) Int. Cl.
*H04W 64/00* (2009.01)
*G01S 5/02* (2010.01)
*H04W 4/029* (2018.01)

(52) U.S. Cl.
CPC ......... *H04W 64/003* (2013.01); *G01S 5/0252* (2013.01); *H04W 4/029* (2018.02)

(58) Field of Classification Search
CPC .... H04W 64/003; H04W 4/029; G01S 5/0252
See application file for complete search history.

(56) References Cited

U.S. PATENT DOCUMENTS

| 2005/0208952 | A1* | 9/2005 | Dietrich | H04W 64/00 455/456.1 |
| 2014/0341198 | A1* | 11/2014 | Han | H04W 8/005 370/338 |
| 2015/0018003 | A1* | 1/2015 | Zhou | H04W 4/021 455/456.1 |
| 2016/0128018 | A1 | 5/2016 | Atreya et al. | |
| 2016/0295360 | A1* | 10/2016 | Jones | H04W 4/029 |

(Continued)

FOREIGN PATENT DOCUMENTS

| CN | 103347278 A | 10/2013 |
| CN | 104968045 A | 10/2015 |

(Continued)

*Primary Examiner* — Minjung Kim
(74) *Attorney, Agent, or Firm* — Conley Rose, P.C.

(57) ABSTRACT

A data processing method includes obtaining positioning data collected during positioning, obtaining a fingerprint set from a location database based on the positioning data, where the fingerprint set includes at least one fingerprint, and each fingerprint in the fingerprint set includes at least one positioning media access control (MAC) address, determining, for each fingerprint in the fingerprint set, a matching degree between the fingerprint and the positioning data based on a second signal strength and a first signal strength of each positioning MAC address in the fingerprint, and determining that an access point (AP) included in the positioning data moves when each of matching degrees of all fingerprints in the fingerprint set is less than a first threshold.

20 Claims, 6 Drawing Sheets

(56) References Cited

U.S. PATENT DOCUMENTS

| | | | |
|---|---|---|---|
| 2018/0352585 A1* | 12/2018 | Yang | H04W 4/30 |
| 2019/0116556 A1* | 4/2019 | Golsch | G07C 9/00309 |
| 2019/0124469 A1* | 4/2019 | Roy | A61B 5/0205 |

FOREIGN PATENT DOCUMENTS

| | | |
|---|---|---|
| CN | 105474720 A | 4/2016 |
| CN | 106937308 A | 7/2017 |

\* cited by examiner

CONT. FROM FIG. 7A

CONT. FROM FIG. 7A

708. For each fingerprint in the fingerprint set, the terminal calculates a degree of matching between the fingerprint and the positioning data based on whether the first weight value is equal to the second weight value of each AP relationship pair in the second AP relationship pair set 709. When matching degrees of all fingerprints in the fingerprint set each are less than a first threshold, the terminal determines that an AP included in the positioning data moves and notifies the server of the moving 711. When determining that there is a fingerprint whose matching degree is greater than a second threshold, the terminal calculates a location by using the fingerprint whose matching degree is greater than the second threshold and the positioning data 710. The server deletes the fingerprint from the location database 712. When determining that a largest matching degree in the matching degrees of all the fingerprints in the fingerprint set is less than the second threshold and greater than the first threshold, the terminal generates an alarm event for the positioning data and sends the alarm event to the server

FIG. 7B

DATA PROCESSING METHOD AND APPARATUS

CROSS-REFERENCE TO RELATED APPLICATIONS

This application is a U.S. National Stage of International Patent Application No. PCT/CN2017/112905 filed Nov. 24, 2017, which is hereby incorporated by reference in its entirety.

TECHNICAL FIELD

This application relates to the field of communications technologies, and in particular, to a data processing method and apparatus.

BACKGROUND

Currently, constructing a location database in a crowdsourcing manner to provide a wireless positioning service for a user is a commonly used method in the industry, and constructing a location database in a crowdsourcing manner is creating and updating the location database based on geographical locations and wireless fidelity (Wireless Fidelity, WiFi) information or base station information that are reported by a large quantity of users every day. Therefore, when using a location service application, a user can determine, without a need of enabling a global positioning system (Global Positioning System, GPS), a current geographical location of the user only by using information about nearby WiFi obtained through scanning or information about a connected base station. This provides positioning services such as a navigation service and a location push service.

Because crowdsourcing data has wide location coverage including city-level coverage, national coverage, and even global coverage, a location database obtained through crowdsourcing data processing includes an extremely large amount of data, and a real-time positioning response cannot be performed. In other words, data in a location database actually used for positioning calculation may not be the latest real-time positioning data. For example, the location database used for positioning calculation is cached in a terminal and is updated at a preset time interval. In this case, if several wireless access points (Wireless Access Point, AP) migrate within the preset time interval, a distribution location of the APs in the location database deviates from a current actual location. Particularly, once all the APs migrate, the migration cannot be found according to an existing positioning algorithm. However, a calculated location is very different from an actual location. This seriously affects a positioning effect.

SUMMARY

This application provides a data processing method and apparatus, to identify whether an access point in positioning data migrates, so as to improve positioning accuracy.

According to one aspect, this application provides a data processing method. The method may include: obtaining positioning data collected during positioning, where the positioning data includes a media access control MAC address and a signal strength of each access point AP, the MAC address in the positioning data is referred to as a positioning MAC address, and the signal strength that is of the AP identified by the positioning MAC address and that is in the positioning data is referred to as a first signal strength of the positioning MAC address; obtaining a fingerprint set from a location database based on the positioning data, where the fingerprint set includes at least one fingerprint, each fingerprint in the fingerprint set includes at least one positioning MAC address, and a signal strength that is of the AP identified by the positioning MAC address and that is in a fingerprint in which the AP is located is referred to as a second signal strength of the positioning MAC address; determining, for each fingerprint in the fingerprint set, a degree of matching between the fingerprint and the positioning data based on a second signal strength and a first signal strength of each positioning MAC address in the fingerprint; and when matching degrees of all fingerprints in the fingerprint set each are less than a first threshold, determining that an AP included in the positioning data moves.

The positioning data is obtained by a terminal by starting a WiFi signal scanning program for scanning a beacon frame signal broadcast by a nearby access point.

It can be learned that, in this embodiment of this application, not only the fingerprint including at least one positioning MAC address needs to be obtained, but also the degree of matching between the fingerprint and the positioning data needs to be determined based on the first signal strength and the second signal strength of each positioning MAC address in the fingerprint, so that when the obtained matching degree of each fingerprint is less than the first threshold, it is determined that the AP included in the positioning data moves.

The location database may be an offline location database or an online location database. If the location database is the online location database, after obtaining the positioning data, the terminal may send the positioning data to a server. The server performs the foregoing steps to determine whether the AP in the positioning data migrates, and returns a determining result to the terminal. If the location database is the offline location database, the location database is stored in the terminal. Therefore, the terminal may perform the foregoing steps to determine whether the AP in the positioning data migrates.

In an implementation, when the fingerprint that includes at least one positioning MAC address and that is in the location database is obtained, there may be a plurality of obtained fingerprints. Correspondingly, a degree of matching between each fingerprint and the positioning data needs to be determined. When determined matching degrees of all the fingerprints is less than the first threshold, it may be determined that the AP in the positioning data migrates, in other words, the AP in the positioning data moves. Consequently, a distribution location (the distribution location may also be referred to as a signal field) formed by APs in the positioning data deviates from a distribution location (the distribution location may also be referred to as the signal field) formed by the APs in the location database.

Correspondingly, for the positioning data in which deviation occurs, these positioning MAC addresses and second signal strengths of these positioning MAC addresses may be deleted from the location database, a deletion event is generated, and the deletion event is notified to the server or is prompted to the user.

In another implementation, the data processing method further includes: when there is a fingerprint whose matching degree is greater than a second threshold, or when the fingerprint set includes a fingerprint whose matching degree is greater than the second threshold, calculating a location by using the fingerprint whose matching degree is greater than the second threshold. For example, if there is a fingerprint whose degree of matching between the positioning data is greater than the second threshold and that is in the plurality of obtained fingerprints, a location corresponding to the positioning data may be calculated by using the fingerprint. If matching degrees between the plurality of fingerprints and the positioning data are greater than the second threshold, the location corresponding to the positioning data is calculated by using the plurality of fingerprints or by using a fingerprint with a highest matching degree.

In still another implementation, the data processing method further includes: generating an alarm event for the positioning data when the matching degrees of all the fingerprints in the fingerprint set each are less than the second threshold and when the fingerprint set includes a fingerprint whose matching degree is less than the second threshold and greater than the first threshold. For example, there is a fingerprint whose degree of matching between the positioning data is a largest matching degree and that is in the plurality of obtained fingerprints, but the largest matching degree is less than the second threshold and greater than the first threshold. Therefore, the alarm event may be generated for the positioning data, and the positioning data is stored for subsequent observation.

In an implementation, each fingerprint in the fingerprint set includes the at least one positioning MAC address, the fingerprint set is further a set of fingerprints including a first MAC address in the location database, and the first MAC address is a positioning MAC address with a highest first signal strength in the positioning data. In other words, each fingerprint obtained from the location database has a positioning MAC address with a highest first information strength. For example, if the positioning MAC address with a highest signal strength in the positioning data, in other words, with a highest first signal strength, is a positioning MAC address A, each fingerprint in the fingerprint set includes the positioning MAC address A.

In another implementation, each fingerprint in the fingerprint set includes the at least one positioning MAC address, the fingerprint set is a set of fingerprints including a second MAC address in the location database, and the second MAC address is a positioning MAC address whose first signal strength is greater than a signal strength threshold in the positioning data. In other words, each fingerprint obtained from the location database has at least one positioning MAC address whose first signal strength is greater than a signal strength threshold.

In still another implementation, each fingerprint in the fingerprint set includes the at least one positioning MAC address, and the fingerprint set is a set of fingerprints including the second MAC address in the location database. In other words, each fingerprint in the fingerprint set obtained from the location database based on the positioning data is a fingerprint that includes a positioning MAC address whose signal strength is greater than the signal strength threshold. In an implementation, the determining, for each fingerprint in the fingerprint set, a degree of matching between the fingerprint and the positioning data based on a second signal strength and a first signal strength of each positioning MAC address included in the fingerprint includes: generating a first AP relationship pair set based on an AP relationship pair including any two APs in the positioning data; for each fingerprint in the fingerprint set, generating a second AP relationship pair set based on an AP relationship pair including APs identified by any two positioning MAC addresses in the fingerprint; for each fingerprint in the fingerprint set, setting first weight value for each AP relationship pair in the first AP relationship pair set based on the first signal strength of each positioning MAC address in the fingerprint, and setting a second weight value for each AP relationship pair in the second AP relationship pair set based on the second signal strength of each positioning MAC address included in the fingerprint; and calculating, for each fingerprint in the fingerprint set, the degree of matching between the fingerprint and the positioning data based on whether the first weight value is equal to the second weight value of each AP relationship pair in the second AP relationship pair set.

If there is one AP relationship pair in the fingerprint whose first weight value and second weight value are equal, the degree of matching between the fingerprint and the positioning data is increased by a preset value; or if the first weight value and the second weight value are not equal, the degree of matching between the fingerprint and the positioning data is not increased by the preset value, until comparing of each AP relationship pair in the second AP relationship pair set in the fingerprint is complete, and a matching degree in this case is the degree of matching between the fingerprint and the positioning data.

When there is a plurality of fingerprints that are obtained from the location database and that each includes the at least one positioning MAC address, a degree of matching between each fingerprint and the positioning data is calculated by using a method similar to the foregoing description, in other words, based on a first weight value and a second weight value of each AP relationship pair in a second AP relationship pair set in each fingerprint.

In another implementation, the determining, for each fingerprint in the fingerprint set, a degree of matching between the fingerprint and the positioning data based on a second signal strength and a first signal strength of each positioning MAC address included in the fingerprint includes: for each fingerprint in the fingerprint set, setting a first weight value and a second weight value for the positioning MAC address respectively based on the first signal strength and the second signal strength of each positioning MAC address in the fingerprint; and calculating, for each fingerprint in the fingerprint set, the degree of matching between the fingerprint and the positioning data based on whether the first weight value and the second weight value of each positioning MAC address in the fingerprint are equal.

If there is one positioning MAC address in the fingerprint whose first weight value and second weight value are equal, the degree of matching between the fingerprint and the positioning data is increased by a preset value; or if the first weight value and the second weight value are not equal, the degree of matching between the fingerprint and the positioning data is not increased by the preset value, until comparing of each positioning MAC address in the fingerprint is complete, and a matching degree in this case is the degree of matching between the fingerprint and the positioning data.

Compared with the method for calculating the matching degree in the foregoing implementation, a key of the method for calculating the matching degree in this implementation lies in that, in this implementation, the degree of matching between the fingerprint and the positioning data is calculated based on the first signal strength and the second signal strength of each positioning MAC address in the fingerprint. In other words, when a signal strength of an AP in the positioning data is high, and a signal strength of the AP in the fingerprint is also high or is medium, it indicates that there is no great difference between a scenario of the AP corresponding to the positioning data and a scenario of the AP corresponding to the fingerprint, in other words, the degree of matching between the fingerprint and the positioning data may be increased; otherwise, the degree of matching between the fingerprint and the positioning data is not increased.

It can be learned that in the foregoing two implementations, the matching degree of the two scenarios are determined based on the signal strengths of the positioning MAC address in the two scenarios: the fingerprint and the positioning data. Therefore, when the matching degree is greater than a threshold, it indicates that the two scenarios: the fingerprint and the positioning data are basically similar, in other words, it may be determined that the AP in the positioning data migrates or most APs in the positioning data do not migrate, and the location may be calculated by using the positioning data.

The first signal strength and the second signal strength of the positioning MAC address may be determined based on the signal strength value of the AP identified by the positioning MAC address when the positioning data or the fingerprint is collected. For example, the first signal strength and the second signal strength may be classified into three levels: high, medium, and low. The first signal strength and the second signal strength of the locating MAC address are determined based on the signal strength value of the AP identified by the locating MAC address when the locating data or the fingerprint is collected and a signal strength value range corresponding to the three levels.

In an implementation, after the obtaining positioning data collected during positioning, and before the obtaining a fingerprint set from a location database based on the positioning data, the method further includes: deleting a positioning MAC address that is not in the location database and a first signal strength of the positioning MAC address from the positioning data. Alternatively, the terminal obtains a MAC address list of each scanned access point AP, adds the MAC address list into the location database, obtains a matched MAC address (the matched MAC address is a MAC address exists in the location database) in the location database, and marks the matched MAC address as the positioning MAC, to form the positioning data. Alternatively, the terminal obtains a MAC address list of each scanned access point AP and MAC addresses that are in the MAC address list and that exist in the location database form the positioning data. Alternatively, the terminal obtains a MAC address list of each scanned AP, and sends the MAC address list to a server in which the location database is located. After receiving the MAC address list, the server queries the location database, and obtains MAC addresses that are in the MAC address list and that exist in the location database to form the positioning data, and sends the positioning data to the terminal.

In this implementation, it can be avoided that the MAC address list collected by scanning includes some abnormal APs such as a moved AP or a migrated AP, where the abnormal APs do not exist in the location database. The foregoing process of querying the location database is equivalent to filtering the collected MAC address list, and the MAC address list that actually participates in the positioning calculation is used to generate the positioning data.

In an implementation, the location database is not formed in a form of a fingerprint. For example, in a radio map scenario, the location database is formed by MAC scatter points, and each scatter point includes a MAC address, a signal strength, and corresponding longitude and latitude coordinates. In this case, when the foregoing data processing method is performed, an AP identified by at least one positioning MAC address included in the location database based on radio map positioning needs to be reconstructed into a fingerprint.

According to another aspect, an embodiment of this application further provides a data processing apparatus, where the data processing apparatus may include the implementation solutions in the first aspect. The functions may be implemented by hardware, or may be implemented by hardware executing corresponding software. The hardware or the software includes one or more units corresponding to the functions. The unit may be software and/or hardware. Based on a same inventive concept, for problem-resolving principles and beneficial effects of the data processing apparatus, refer to the first aspect, the possible implementations, and the beneficial effects. Details are not described.

Tis application provides a computer storage medium, configured to store a computer software instruction used in the data processing method in the foregoing aspect. The computer software instruction includes a program designed for performing the foregoing aspect.

According to still another aspect, this application further provides a computer program product that includes an instruction. When the computer program product is run on a computer, the computer is enabled to perform the data processing method according to the foregoing aspects.

According to still another aspect, this application provides a chip system. The chip system includes a processor, configured to implement functions in the foregoing aspects, for example, determine or detect data and/or information in the foregoing methods. In a possible design, the chip system further includes a memory. The memory is configured to store a necessary program instruction and necessary data. The chip system may include a chip, or may include a chip and another discrete device.

BRIEF DESCRIPTION OF DRAWINGS

FIG. 7A and FIG. 7B are a schematic structural diagram of a data processing system according to an embodiment of the present invention.

DESCRIPTION OF EMBODIMENTS

Figure 1A:
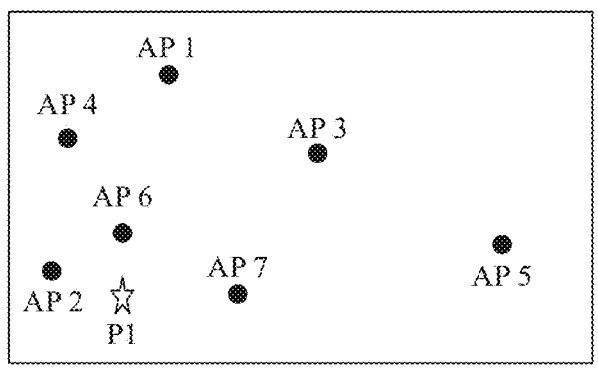
FIG. 1A and FIG. 1B are respectively schematic diagrams of distribution of access points included in positioning data in an actual environment and a location database according to an embodiment of this application.

The following describes technical solutions of the embodiments in this application with reference to accompanying drawings.

In the embodiments of this application, crowdsourcing data generally includes location information and signal information. The location information is location information of a collection point obtained when the crowdsourcing data is collected, for example, longitude and latitude coordinates. The signal information is information about an access point obtained through scanning at a location of the collection point, for example, a media access control (Media Access Control, MAC) address and a signal strength of the access point.

There are also two types of location databases constructed based on the crowdsourcing data. One type of location database exists in a form of a fingerprint. To be specific, crowdsourcing data collected at each collection point is stored in a form of a fingerprint, and a location of the collection point corresponds to signal information of at least one access point. In other words, each fingerprint includes MAC addresses and signal strengths of a plurality of access points. The other type of location database exists in a form of a radio map. To be specific, crowdsourcing data collected at each collection point includes a MAC scatter point, and each scatter point includes a MAC address, a signal strength, and corresponding longitude and latitude coordinates. Based on the MAC address, the signal strength, and the corresponding longitude and latitude coordinates included in each scatter point, the location database that exists in a form of a radio map may be reconstructed into the location database that exists in a form of a fingerprint. For example, longitude and latitude coordinates are used as a reference, and a MAC address and a signal strength of an access point that can be scanned in a preset range of the reference are stored as one fingerprint, in other words, a fingerprint corresponding to location information represented by the longitude and latitude coordinates.

A large quantity of users report crowdsourcing data including location information and signal information every day, and a location database obtained by processing the crowdsourcing data includes an extremely large amount of data and cannot be updated in real time. Consequently, a location database used during actual positioning may not be the latest location database. For example, the location database may be backed up into two same databases: a foreground location database and a background location database.

The foreground location database is stored on a side of a terminal, and is mainly responsible for processing a positioning request and performing positioning calculation. The background location database is stored on a side of a server. The background location database may be updated as quickly as possible based on the crowdsourcing data reported by the users, but the foreground location database may be updated by the background location database at an interval of a period of time, so that the terminal can implement offline positioning.

However, neither the foreground location database nor the background location database is the latest database. To be specific, locations of several access points may migrate at an update interval of the location database, and consequently a distribution location of the APs in the location database deviates from an actual location.

Especially, when all APs in a specific area of the location database migrate to another area, a location calculated by using a positioning algorithm is very different from an actual location. For example, access points included in a fingerprint corresponding to a location A in the location database are respectively an AP 1, an AP 2, and an AP 3. However, before the location database is updated, the AP 1, the AP 2, and the AP 3 all migrate to a location B. In this case, positioning data collected by the terminal at the location B is signal information of the AP 1, the AP 2, and the AP 3. A location obtained after positioning calculation is performed by adding the signal information to the location database is the location A. It can be learned that a positioning error is very serious if the location A and the location B are different cities.

Therefore, to improve positioning accuracy, whether an AP in positioning data migrates needs to be first determined before positioning calculation is performed in the embodiments of this application.

Positioning data collected by the terminal at a specific location point includes a MAC address and a signal strength of each access point that can be scanned at the location point at a current moment. In other words, the location point corresponds to a point in a signal field formed by signals that are broadcast by all access points.

Therefore, if the location database includes a migrated access point or all access points migrate, signal fields formed by signals that are broadcast by same access points before and after migration are different. In other words, a magnitude relationship between signal strengths of access points in the positioning data is different from a magnitude relationship between signal strengths of access points in the location database.

Figure 1B:
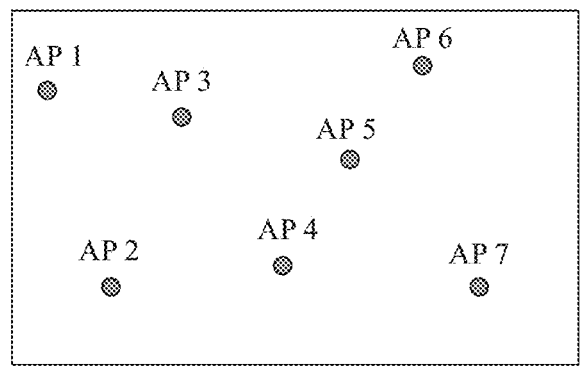

For example, FIG. 1A and FIG. 1B are respectively schematic diagrams of distribution of access points included in positioning data in an actual environment and a location database according to an embodiment of this application. For example, positioning data includes seven access points in total from an AP 1 to an AP 7. FIG. 1B is a schematic diagram of distribution of the seven access points in the location database, FIG. 1A is a schematic diagram of distribution of the seven access points in the actual environment, where P1 is an actual location point at which the positioning data is collected. For example, for the location point P1, signal strengths of three access points: the AP 2, the AP 6, and the AP 7 are higher, and signal strengths of four access points: the AP 4, the AP 1, the AP 3, and the AP 5 are lower. However, a magnitude relationship between signal strengths of the seven access points in the location database no longer satisfies a magnitude relationship between the foregoing signal strengths. For example, relative distances between the three access points: the AP 2, the AP 6, and the AP 7 are all relatively far in the location database. Therefore, a situation in which the signal strengths of the three access points are all higher does not exist in the location database, and correspondingly a situation in which the signal strengths of the four points: the AP 4, the AP 1, the AP 3, and the AP 5 are all lower does not exist in the location database either. Consequently, an access point in the positioning data migrates, and this causes relatively low positioning accuracy.

In other words, if a degree of matching between a signal strength relationship of all access points in the positioning data and a signal strength relationship of these access points in the location database is relatively high, it indicates that there is no great difference between a location obtained before an access point migrates and a location obtained after the access points migrates, or a proportion of migrated access points is relatively small. In this case, a location may be calculated by using data of the positioning data in the location database. If a matching degree is relatively low, it indicates that there is a relatively great difference between a location obtained before an access point migrates and a location obtained after the access points migrates, a proportion of migrated access points is relatively large, or the like. Consequently, a location cannot be calculated by using data of the positioning data in the location database. If a matching degree is intermediate, it indicates that an access point migration situation is not clear, and the positioning data may be added to an alarm event for subsequent observation and processing.

Therefore, the location database constructed in a form of a fingerprint is used as an example in the embodiments of this application to provide a data processing method. According to the data processing method, a degree of matching between a magnitude relationship of signal strengths of access points in the positioning data and a magnitude relationship of the signal strengths of the access points in the location database can be determined, to determine whether an AP in the positioning data migrates.

In the embodiments of this application, an operation of determining the degree of matching between a magnitude relationship of signal strengths of access points in the positioning data and a magnitude relationship of signal strengths of the access points in the location database may be implemented by the terminal, or may be implemented by a server. For example, when the location database is stored in the terminal, in other words, when offline positioning is performed, the foregoing operation may be implemented by the terminal. When the location database is stored in the server, in other words, when online positioning is performed, the foregoing operation may be implemented by the server. A difference is that the terminal needs to send collected positioning data to the server, and the server needs to return a processing result to the terminal.

The terminal may be an access terminal, user equipment (user equipment, UE), a subscriber unit, a subscriber station, a mobile station, a mobile console, a remote station, a remote terminal, a mobile terminal, a user terminal, a terminal, a wireless communications device, a user agent, a user apparatus, or the like. The access terminal may be a device such as a cellular phone, a cordless telephone set, a session initiation protocol (session initiation protocol, SIP) phone, a wireless local loop (wireless local loop, WLL) station, a personal digital processing (personal digital assistant. PDA), a handheld device, a vehicle-mounted device, a wearable device, a terminal device in an internet of things, a terminal device in a future 5G network, or a terminal device in a future evolved public land mobile network (public land mobile network, PLMN). The server may be a server corresponding to a positioning application.

The following describes the foregoing principle in detail by using an embodiment.

Figure 2:
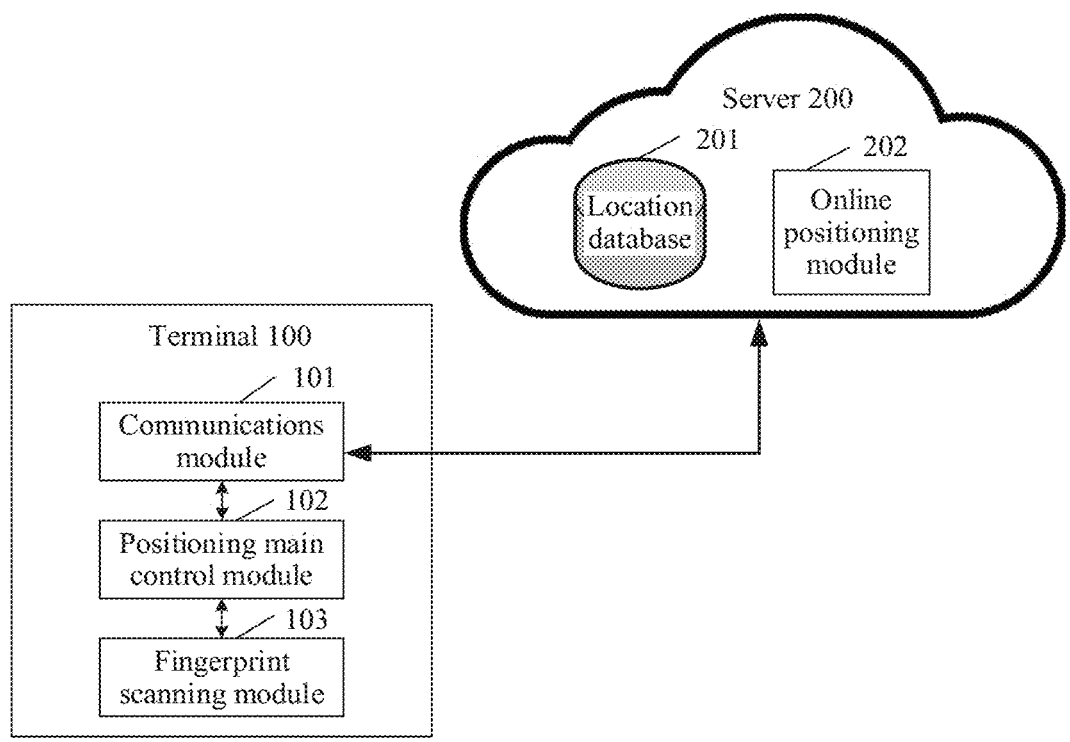
FIG. 2 is a schematic structural diagram of an online positioning system according to an embodiment of the present invention.

FIG. 2 is a schematic structural diagram of an online positioning system according to an embodiment of the present invention. As shown in FIG. 2, a terminal 100 may include a communications module 101, a positioning main control module 102, and a fingerprint scanning module 103; and a server 200 may include a location database 201 and an online positioning module 202.

The positioning main control module 102 is configured to control and coordinate the modules, and may be located in a memory of the terminal.

The fingerprint scanning module 103 is configured to scan a bottom-layer WiFi signal to obtain positioning data, and may be located in a WiFi chip of the terminal.

The communications module 101 is configured to communicate with the server to transfer information such as the positioning data, fingerprint data, and a positioning result by using a communications protocol, for example, by using WiFi or a base station, or through cell data communication.

The online positioning module 202 is configured to perform positioning calculation, to generate the positioning result, and may be integrated into the server.

The location database 201 is a database used for positioning calculation, and is configured to store fingerprint information such as a location and corresponding signal information. For an online positioning architecture, the location database is stored in a positioning server on a network side.

Figure 3:
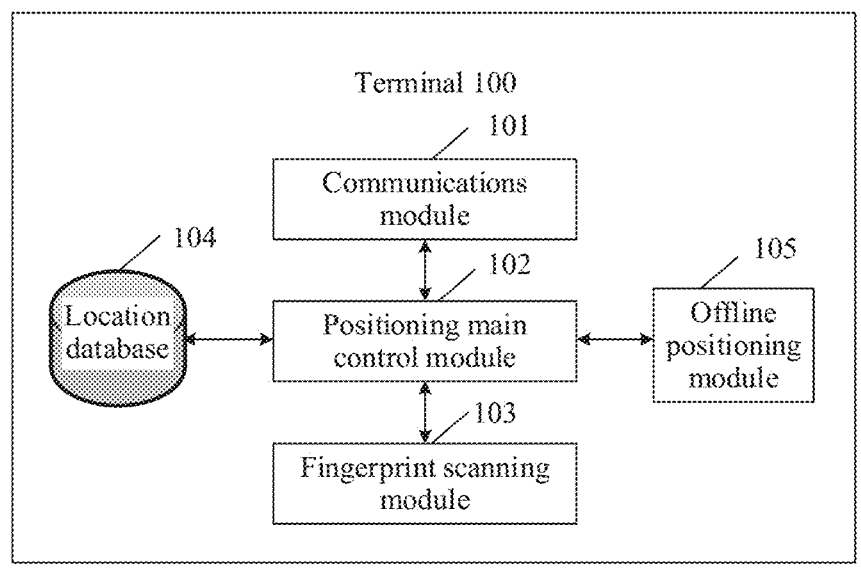
FIG. 3 is a schematic structural diagram of an offline positioning system according to an embodiment of the present invention.

FIG. 3 is a schematic structural diagram of an offline positioning system according to an embodiment of the present invention. A difference between the structure shown in FIG. 3 and the structure shown in FIG. 2 lies in that the terminal further includes a location database 104. The location database 104 is stored in a storage medium of the terminal. The terminal further includes an offline positioning module 105, and the offline positioning module 105 is configured to execute a function similar to that of the online positioning module, in other words, configured to perform positioning calculation to generate a positioning result, and is located in the memory of the terminal.

In the offline positioning system, the fingerprint scanning module 103 obtains positioning data collected during positioning, and the positioning main control module 102 sends the positioning data to the offline positioning module 104. The offline positioning module 104 obtains a magnitude relationship of signal strengths of access points in the positioning data included in the location database 104, and calculates a degree of matching between a magnitude relationship of signal strengths of access points in the positioning data and the magnitude relationship of the signal strengths of the access points in the positioning data. In other words, the offline positioning module 105 calculates a degree of matching between a signal field of the access points in the location database and a signal field in the positioning data. In other words, the offline positioning module 105 calculates a degree of matching between the positioning data and a fingerprint including the positioning data in the location database. When the matching degree is relatively low, it is determined that an AP in the positioning data migrates. When the matching degree is relatively high, it is determined that an AP in the positioning data does not migrate or a migrated AP imposes little impact on the signal field, and a location may be calculated by using data of the positioning data in the location database such as a fingerprint. When the matching degree is intermediate, for example, is not high or not low, or is between two thresholds, an alarm event may be generated to continue to observe a signal field formed by APs included in the positioning data, to determine whether an AP migrates.

In the online positioning system, the fingerprint scanning module 103 obtains the positioning data collected during positioning, and the positioning main control module 102 sends the positioning data to the online positioning module 202 by using the communications module 101. The online positioning module 202 obtains a magnitude relationship of signal strengths of access points in the positioning data in the location database 201, and calculates a degree of matching between a magnitude relationship of signal strengths of access points in the positioning data and the magnitude relationship of the signal strengths of the access points in the positioning data. In other words, the online positioning module 202 calculates a degree of matching between a signal field of the access points in the location database and a signal field in the positioning data, or calculates a degree of matching between the positioning data and a fingerprint that is in the location database and that includes the positioning data. When the matching degree is relatively low, it is determined that an AP in the positioning data migrates, and the result is notified to the terminal. When the matching degree is relatively high, it is determined that an AP in the positioning data does not migrate or a migrated AP imposes little impact on the signal field, the location may be calculated by using the data of the positioning data in the location database such as a fingerprint, and the calculated location is notified to the terminal. When the matching degree is intermediate, for example, is not high or not low, or is between two thresholds, the alarm event may be generated to continue to observe the signal field formed by the APs included in the positioning data, to determine whether the AP migrates; and a result is notified to the terminal.

Figure 4:
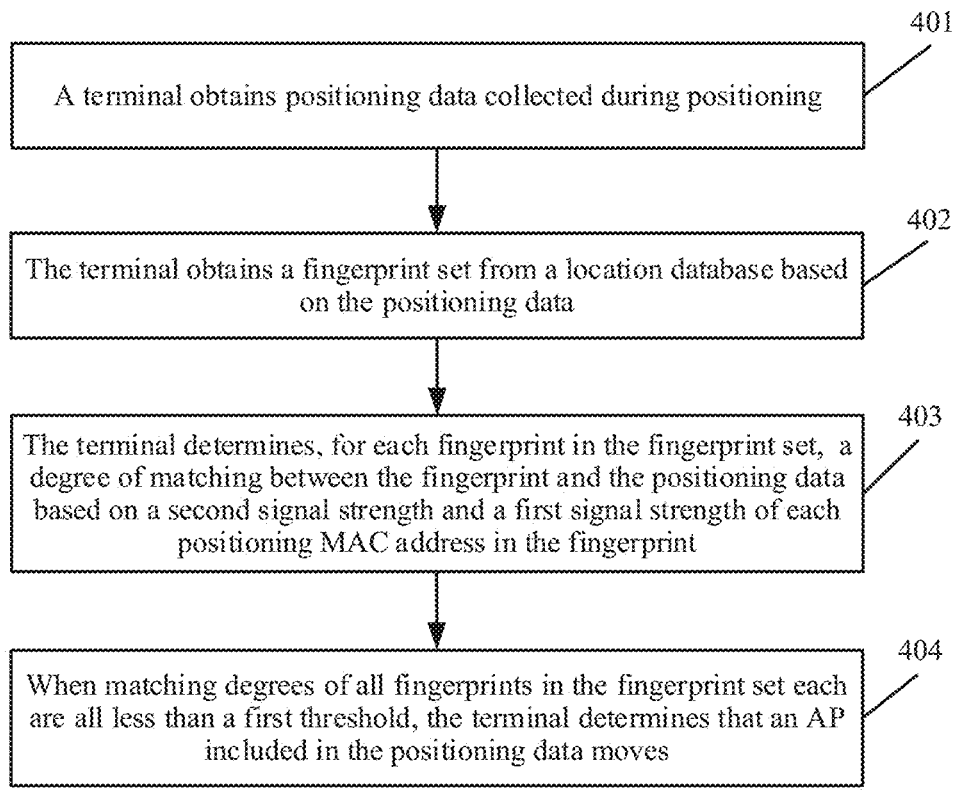
FIG. 4 is a schematic flowchart of a data processing method according to an embodiment of this application.

FIG. 4 is a schematic flowchart of a data processing method according to an embodiment of this application. As shown in FIG. 4, for example, a terminal performs the data processing method, and a location database is located on a side of the terminal for performing offline positioning. The data processing method may include the following steps.

401. The terminal obtains positioning data collected during positioning, where the positioning data includes a media access control MAC address and a signal strength of each access point AP, the MAC address in the positioning data is referred to as a positioning MAC address, and the signal strength that is of the AP identified by the positioning MAC address and that is in the positioning data is referred to as a first signal strength of the positioning MAC address.

402. The terminal obtains a fingerprint set from the location database based on the positioning data, where the fingerprint set includes at least one fingerprint, each fingerprint in the fingerprint set includes at least one positioning MAC address, and a signal strength that is of an AP identified by the positioning MAC address and that is in a fingerprint in which the AP is located is referred to as a second signal strength of the positioning MAC address.

The location database may include a plurality of fingerprints, and each fingerprint includes the at least one positioning MAC address. The signal strength that is of the AP identified by the positioning MAC address and that is in the positioning data is a signal strength of the AP identified by the positioning MAC address obtained through scanning when the terminal collects the positioning data. The signal strength that is of the AP identified by the positioning MAC address and that is in the fingerprint is a signal strength of the AP identified by the positioning MAC address when the fingerprint is collected. When the positioning MAC address exists in a plurality of fingerprints, the positioning MAC address has a signal strength in each fingerprint. In other words, the positioning MAC address has a plurality of second signal strengths. A degree of matching between a fingerprint and the positioning data is calculated based on a first signal strength of each positioning MAC address included in the fingerprint and a second signal strength of each positioning MAC address included in the fingerprint.

In an implementation, each fingerprint in the fingerprint set includes the at least one positioning MAC address, the fingerprint set is further a set of fingerprints including a first MAC address in the location database, and the first MAC address is a positioning MAC address with a highest first signal strength in the positioning data. In other words, each fingerprint obtained from the location database has a positioning MAC address with a highest first information strength. For example, if the positioning MAC address with a highest signal strength in the positioning data, in other words, with a highest first signal strength, is a positioning MAC address A, each fingerprint in the fingerprint set includes the positioning MAC address A.

In another implementation, each fingerprint in the fingerprint set includes the at least one positioning MAC address, the fingerprint set is a set of fingerprints including a second MAC address in the location database, and the second MAC address is a positioning MAC address whose first signal strength is greater than a signal strength threshold in the positioning data. In other words, each fingerprint obtained from the location database has at least one positioning MAC address whose first signal strength is greater than the signal strength threshold.

In still another implementation, each fingerprint in the fingerprint set includes the at least one positioning MAC address, and the fingerprint set is a set of fingerprints including a second MAC address in the location database. In other words, each fingerprint in the fingerprint set obtained from the location database based on the positioning data is a fingerprint that includes a positioning MAC address whose signal strength is greater than a signal strength threshold.

403. The terminal determines, for each fingerprint in the fingerprint set, the degree of matching between the fingerprint and the positioning data based on the second signal strength and the first signal strength of each positioning MAC address in the fingerprint.

404. When matching degrees of all fingerprints in the fingerprint set each are less than a first threshold, the terminal determines that an AP included in the positioning data moves.

In an implementation, after obtaining the positioning data collected during positioning in step 401, the terminal may delete a positioning MAC address that is not in the location database and a first signal strength of the positioning MAC address from the positioning data. For example, when the positioning data includes positioning MAC addresses of an AP 1 to an AP 8 and first signal strengths of the AP 1 to the AP 8, but the location database includes only positioning MAC addresses of the AP 1 to the AP 7 and first signal strengths of the AP 1 to the AP 7, the terminal deletes a positioning MAC address of the AP 8 and a first signal strength of the AP 8 from the positioning data. In this case, an abnormal MAC address such as an address that migrates in the location database may be preliminarily deleted from the positioning data. This helps improve accuracy of determining whether an AP in the positioning data migrates in this embodiment of this application.

The terminal may start a WiFi signal scanning program of a fingerprint scanning module, to scan beacon beacon frame signals that are broadcast by nearby access points, and obtain positioning data from the beacon frame signals. In addition to MAC addresses and signal strengths of access points, the positioning data may further include a scanning time of each access point and the like.

In an implementation, there may be a plurality of fingerprints that are obtained by the terminal from the location database and that each include the at least one positioning MAC address in step 402. When there are the plurality of fingerprints, in step 403, the terminal determines, for each fingerprint in the fingerprint set, the degree of matching between the fingerprint and the positioning data based on the second signal strength and the first signal strength of each positioning MAC address in the fingerprint. Correspondingly, in step 404, the terminal may compare a matching degree of each fingerprint with the first threshold. When the matching degrees of all the fingerprints each are less than the first threshold, the terminal may determine that an AP included in the positioning data moves.

Correspondingly, in some implementations, the terminal may further compare the matching degree of each fingerprint with a second threshold. When a matching degree of at least one fingerprint is greater than the second threshold, the terminal may calculate, by using a fingerprint whose matching degree is greater than the second threshold, a location corresponding to the positioning data.

Correspondingly, in some implementations, the terminal may further compare the matching degree of each fingerprint with the first threshold and the second threshold. An alarm event may be generated for the positioning data when the matching degrees of all the fingerprints in the fingerprint set each are less than the second threshold and when the fingerprint set includes a fingerprint whose matching degree is less than the second threshold and greater than the first threshold.

In some implementations, that the terminal determines, for each fingerprint in the fingerprint set, the degree of matching between the fingerprint and the positioning data based on the second signal strength and the first signal strength of each positioning MAC address in the fingerprint includes: generating a first AP relationship pair set based on an AP relationship pair including any two APs in the positioning data; for each fingerprint in the fingerprint set, generating a second AP relationship pair set based on an AP relationship pair including two APs identified by any two positioning MAC addresses in the fingerprint; for each fingerprint in the fingerprint set, setting a first weight value for each AP relationship pair in the first AP relationship pair set based on the first signal strength of each positioning MAC address included in the fingerprint, and setting a second weight value for each AP relationship pair in the second AP relationship pair set based on the second signal strength of each positioning MAC address included in the fingerprint; and for each fingerprint in the fingerprint set, calculating the degree of matching between the fingerprint and the positioning data based on whether the first weight value is equal to the second weight value of each AP relationship pair in the second AP relationship pair set.

The calculating the degree of matching between the fingerprint and the positioning data based on whether the first weight value is equal to the second weight value of each AP relationship pair in the second AP relationship pair set may include: If the specified first weight value and the specified second weight value of each AP relationship pair are equal, the matching degree is set to the first weight value or the second weight value. If the specified first weight value and the specified second weight value of each AP relationship pair are not equal, the matching degree is set to 0. A matching degree obtained by comparing all AP relationship pairs that are set in the fingerprint or a matching degree obtained by comparing all AP relationships in the second AP relationship pair set corresponding to the fingerprint is the degree of matching between the fingerprint and the positioning data.

TABLE 1

| Signal strengths of two positioning MAC addresses in an AP relationship pair | Signal features | Relative location relationship | Importance |
|---|---|---|---|
| High - high | Signal strengths of two APs are very high (>−60 dBm) | A relative distance is very short. | High, set a weight value to 7 |
| High - medium | A signal strength of one AP is very high, and a signal strength of the other AP is medium (−60 dBm to −85 dBm) | A relative distance is medium | High, set a weight value to 5 |
| High - low | A signal strength of one AP is very high, and a signal strength of the other AP is very low (<−85 dBm) | A relative distance is very long | High, set a weight value to 7 |
| Medium - medium | Signal strengths of two APs are medium | A relative distance is medium, but certainty is not high | Medium, set a weight value to 3 |
| Medium - low | A signal strength of one AP is medium, and a signal strength of the other AP is very low | A relative location relationship is uncertain | Low, set a weight value to 1 |
| Low - low | Signal strengths of two APs are very low | A relative location relationship is uncertain | Low, set a weight value to 0 |

In Table 1, the signal strength features of the AP relationship pair may be classified into six cases: "high-high", "high-medium", "high-low", "medium-medium". "medium-low", and "low-low".

The "high-high" signal strength feature is that the signal strengths of the two APs are very high (>−60 dBm). This indicates that the relative distance between the two APs is very short, and deployment locations of the two APs are very close to an actual location point corresponding to the positioning data or a location point corresponding to the fingerprint. This relationship pair can clearly represent a relative location relationship between two APs in a signal field, and has a clearly distinguishing feature for distinguishing whether an AP moves and migrates. Therefore, importance of this AP relationship pair is high, and a weight value of this type of AP relationship pair may be set to 7.

The "high-medium" signal strength feature is that the signal strength of one AP is very high, and the signal strength of the other AP is medium (−60 dBm to −85 dBm). This indicates that the relative distance between the two APs is medium, a deployment location of one AP is very close to an actual location point corresponding to the positioning data or a location point corresponding to the fingerprint, and there is a medium distance between a deployment location of the other AP and the actual location point corresponding to the positioning data or the location point corresponding to the fingerprint. This relationship pair can clearly represent a relative location relationship between two APs in a signal field, and has a clearly distinguishing feature for distinguishing whether an AP moves and migrates. Therefore, importance of this AP relationship pair is high, and a weight value of this type of AP relationship pair is set to 5.

The "high-low" signal feature is that the signal strength of one AP is very high, and the signal strength of the other AP is very low (<−85 dBm). This indicates that the relative distance between the two APs is very long, a deployment location of one AP is very close to an actual location point corresponding to the positioning data or a location point corresponding to the fingerprint, and a deployment location of the other AP is very far away from the actual location point corresponding to the positioning data or the location point corresponding to the fingerprint. This relationship pair can clearly represent a relative location relationship between two APs in a signal field, and has a clearly distinguishing feature for distinguishing whether an AP moves and migrates. Therefore, importance of this AP relationship pair is high, and a weight value of this type of AP relationship pair is set to 7.

The "medium-medium" signal feature is that the signal strengths of the two APs are medium. In this case, it cannot clearly indicate the relative location relationship between the two APs, and it can only indicate that there is a medium distance between each of the two APs and an actual location point corresponding to the positioning data or a location point corresponding to the fingerprint. However, a relative location of the two APs may be very close, or may be very far, and it is probable that the relative distance between the two APs is medium. This relationship can indicate, to some extent, that the relative distance between the two APs is medium, but certainty is not high. Therefore, importance of this AP relationship pair is medium, and a weight value of this type of AP relationship pair is set to 3.

The "medium-low" signal feature is that the signal strength of one AP is medium, and the signal strength of the other AP is very low. This indicates that there is a medium distance between a deployment location of one AP and an actual location point corresponding to the positioning data or a location point corresponding to the fingerprint, a deployment location of the another AP is very far away from the actual location point corresponding to the positioning data or the location point corresponding to the fingerprint. However, the relative location relationship between the two APs is uncertain, and it is not helpful to distinguish whether an AP moves and migrates. Therefore, importance of this AP relationship pair is low, and a weight value of this type of AP relationship pair is set to 1.

The "low-low" signal feature is that the signal strength of the two APs is very low. This indicates that there is a very long distance between a deployment location of each of the two APs and an actual location point corresponding to the positioning data or a location point corresponding to the fingerprint. However, the relative location relationship between two APs is uncertain, and it is not helpful to distinguish whether an AP moves and migrates. Therefore, importance of the AP relationship pair is low, and a weight value of this type of AP relationship pair is set to 0.

According to the preset correspondence between a signal strength and a weight value, the terminal may set the first weight value for each AP relationship pair in the first AP relationship pair set based on the first signal strength of each positioning MAC address included in the fingerprint; set the second weight value for each AP relationship pair in the second AP relationship pair set based on the second signal strength of each positioning MAC address included in the fingerprint; and further calculate the degree of matching between the fingerprint and the positioning data based on whether the first weight value is equal to the second weight value of each AP relationship pair in the second AP relationship pair set corresponding to the fingerprint.

For example, the positioning data includes positioning MAC addresses and signal strengths of three APs, the three APs are respectively an AP 1 to an AP 3, and first signal strengths corresponding to the AP 1 to the AP 3 are respectively high, medium, and low. Therefore, any two APs are one AP relationship pair, and a first AP relationship pair set includes three AP relationship pairs (AP 1, AP 2), (AP 1, AP 3), and (AP 2, AP 3). It is assumed that a fingerprint that includes the AP 1 and the AP 2 and that is in the location database is a fingerprint 1, and a fingerprint that includes the AP 1, the AP 2, and the AP 3 and that is in the location database is a fingerprint 2. A second AP relationship pair set corresponding to the fingerprint 1 is (AP 1, AP 2), and a second AP relationship pair set corresponding to the fingerprint 2 is (AP 1, AP 2), (AP 1, AP 3), and (AP 2, AP 3).

The first weight value and the second weight value of the AP relationship pair are separately set based on the preset correspondence between an AP relationship pair and a weight value. For example, Table 1 shows the preset correspondence between an AP relationship pair and a weight value, and therefore, in the first AP relationship pair set in the positioning data, a first weight value of (AP 1, AP 2) is 5, a first weight value of (AP 1, AP 3) is 7, and a first weight value of (AP 2, AP 3) is 1. Second signal strengths of positioning MAC addresses of the AP 1 and the AP 2 in the fingerprint 1 are respectively low and low, and therefore, a second weight value of (AP 1, AP 2) in the fingerprint 1 is 0. Second signal strengths of positioning MAC addresses of the AP 1, the AP 2, and the AP 3 in the fingerprint 2 are respectively high, medium, and high, and therefore, in the fingerprint 2, a second weight value of (AP 1, AP 2) is 5, a second weight value of (AP 1, AP 3) is 7, and a second weight value of (AP 2, AP 3) is 5.

In this way, a degree of matching between the fingerprint 1 and the positioning data is calculated as follows: In the second AP relationship pair set in the fingerprint 1, a first weight value of (AP 1, AP 2) is 5, the second weight value is 0, the two are unequal, and therefore, the degree of matching between the fingerprint 1 and the positioning data is 0. A degree of matching between the fingerprint 2 and the positioning data is calculated as follows: In the second AP relationship pair set in the fingerprint 2, a first weight value of (AP 1, AP 2) is 5, the second weight value is 5, and therefore, the matching degree plus 5 is equal to 5 (in other words, the matching degree is accumulated by the weight value of the relationship pair, where an initial value of the matching degree is 0). A first weight value and a second weight value of (AP 1, AP 3) in the second AP relationship pair set are both 7, in other words, the two are equal, and the matching degree accumulated by 7 is equal to 12. In the second AP relationship pair set, a first weight value of (AP 2, AP 3) is 1, a second weight value is 5, the two are not equal, and the matching degrees are not accumulated. It can be learned that the degree of matching between the fingerprint 2 and the positioning data is 12. It is assumed that the first threshold is 5, and the second threshold is 10. In this case, there is the fingerprint 2 whose matching degree is greater than the second threshold 10. Therefore, the terminal may perform positioning calculation by using data of the fingerprint 2. For example, the location corresponding to the positioning data may be a location of the fingerprint 2.

In some other implementations, that the terminal determines, for each fingerprint in the fingerprint set, the degree of matching between the fingerprint and the positioning data based on the second signal strength and the first signal strength of each positioning MAC address in the fingerprint includes: for each fingerprint in the fingerprint set, setting a first weight value and a second weight value for the positioning MAC address respectively based on the first signal strength and the second signal strength of each positioning MAC address in the fingerprint; and calculating, for each fingerprint in the fingerprint set, the degree of matching between the fingerprint and the positioning data based on whether the first weight value and the second weight value of each positioning MAC address in the fingerprint are equal. The first weight value and the second weight value that respectively correspond to the first signal strength and the second signal strength may be set based on the preset correspondence between a signal strength and a weight. For example, when a signal strength is preset to be high, a weight value that may be set is 7; when a signal strength is medium, a weight value that may be set is 5; or when a signal strength is low, a weight value that may be set is 0.

The "high" signal strength indicates that a deployment location of an AP is very close to the actual location point corresponding to the positioning data or the location point corresponding to the fingerprint. This type of AP can clearly represent a location status in a signal field, and has a relatively large effect on distinguishing whether the AP moves and migrates. Therefore, importance of this AP is high, and a weight value of a positioning MAC address of the AP with the high signal strength may be set to 7.

The "medium" signal strength indicates that a signal strength of an AP is very high, and there is a medium distance between a deployment location of the AP and the actual location point corresponding to the positioning data or the location point corresponding to the fingerprint. This type of AP can clearly represent a location status in a signal field, and has a relatively large effect on distinguishing whether the AP moves and migrates. Therefore, importance of the AP is high, and a weight value of a positioning MAC address of the AP with the high signal strength may be set to 5.

The "low" signal strength indicates that a signal strength of an AP is very low (<−85 dBm). This indicates that there is a very long distance between a deployment location of the AP and the actual location point corresponding to the positioning data or the location point corresponding to the fingerprint, and it is not helpful to distinguish whether the AP moves and migrates. Therefore, importance of this type of AP is low, and a weight value of a positioning MAC address of the AP with the high signal strength may be set to 0.

For example, the positioning data includes positioning MAC addresses and signal strengths of three APs, the three APs are respectively an AP 1 to an AP 3, and first signal strengths corresponding to the AP 1 to the AP 3 are respectively high, medium, and low. It is assumed that a fingerprint that includes the AP 1 and the AP 2 and that is in the location database is a fingerprint 1, and second signal strengths of positioning MAC addresses of the AP 1 and the AP 2 in the fingerprint 1 are respectively low and low. It is assumed that a fingerprint that includes the AP 1, the AP 2, and the AP 3 and that is in the location database is a fingerprint 2, and second signal strengths of positioning MAC addresses of the AP 1, the AP 2, and the AP 3 in the fingerprint 2 are respectively high, medium, and high.

A degree of matching between the fingerprint 1 and the positioning data is calculated as follows: The first signal strength of the positioning MAC address of the AP 1 is high, a first weight value is 7, the second signal strength is low, a second weight value is 0, the first weight value is not equal to the second weight value, and the matching degree is accumulated by 0. The first signal strength of the positioning MAC address of the AP 2 is high, a first weight value is 7, the second signal strength is low, a second weight value is 0, the first weight value is not equal to the second weight value, and the matching degree is accumulated by 0. Therefore, the degree of matching between the fingerprint 1 and the positioning data is 0.

A degree of matching between the fingerprint 2 and the positioning data is calculated as follows: The first signal strength of the positioning MAC address of the AP 1 is high, a first weight value is 7, the second signal strength is high, a second weight value is 7, the first weight value is equal to the second weight value, and the matching degree is accumulated by 7. The first signal strength of the positioning MAC address of the AP 2 is medium, a first weight value is 5, the second signal strength is medium, a second weight value is 5, the first weight value is equal to the second weight value, and the matching degree is accumulated by 5. The first signal strength of the positioning MAC address of the AP 3 is low, a first weight value is 0, the second signal strength is high, a second weight value is 7, the two are unequal, and the matching degree is accumulated by 0. Therefore, the degree of matching between the fingerprint 2 and the positioning data is 12. It is assumed that the first threshold is 5, and the second threshold is 10. In this case, there is the fingerprint 2 whose matching degree is greater than the second threshold 10. Therefore, the terminal may perform positioning calculation by using data of the fingerprint 2. For example, the location corresponding to the positioning data may be a location of the fingerprint 2.

In conclusion, when the degree of matching between the fingerprint and the positioning data is calculated, when the first weight value is equal to the second weight value, the matching degree may be accumulated by the weight value. When the first weight value is not equal to the second weight value, the matching degree is not accumulated by the weight value. Therefore, the degree of matching between the fingerprint and the positioning data may be obtained.

It may be learned that in the data processing method shown in FIG. 4, whether the AP in the positioning data migrates is identified by calculating the degree of matching between the positioning data and the fingerprint. Once it is identified that migration occurs, the terminal may delete positioning MAC data from the location database, to improve positioning accuracy. If migration does not occur, a fingerprint with a highest matching degree may be used to calculate a location corresponding to positioning data. An alarm event for the positioning data may be generated for continuous observation if it is identified that the matching degrees of all the fingerprints in the fingerprint set each are less than the second threshold and when the fingerprint set includes a fingerprint whose matching degree is less than the second threshold and greater than the first threshold.

Figure 5:
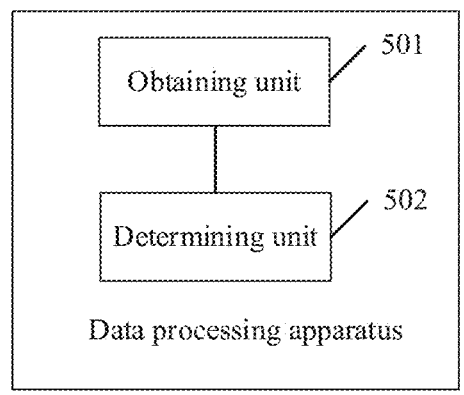
FIG. 5 is a schematic structural diagram of a data processing apparatus according to an embodiment of the present invention.

FIG. 5 is a schematic structural diagram of a data processing apparatus according to an embodiment of the present invention. As shown in FIG. 5, the data processing apparatus includes an obtaining unit 501 and a determining unit 502.

The obtaining unit 501 is configured to obtain positioning data collected during positioning, where the positioning data includes a media access control MAC address and a signal strength of each access point AP, the MAC address in the positioning data is referred to as a positioning MAC address, and the signal strength that is of the AP identified by the positioning MAC address and that is in the positioning data is referred to as a first signal strength of the positioning MAC address.

The obtaining unit 501 is further configured to obtain a fingerprint set from a location database based on the positioning data, where the fingerprint set includes at least one fingerprint, each fingerprint in the fingerprint set includes at least one positioning MAC address, and a signal strength that is of an AP identified by the positioning MAC address and that is in a fingerprint in which the AP is located is referred to as a second signal strength of the positioning MAC address.

The determining unit 502 is configured to determine, for each fingerprint in the fingerprint set, a degree of matching between the fingerprint and the positioning data based on a second signal strength and a first signal strength of each positioning MAC address in the fingerprint.

The determining unit is further configured to: when matching degrees of all fingerprints in the fingerprint set each are less than a first threshold, determine that an AP included in the positioning data moves.

In some embodiments, the apparatus further includes:

a calculation unit, configured to: when the fingerprint set includes a fingerprint whose matching degree is greater than a second threshold, calculate a location by using the fingerprint whose matching degree is greater than the second threshold, where the second threshold is greater than the first threshold.

In some embodiments, the apparatus further includes:

a generation unit, configured to generate an alarm event for the positioning data when the matching degrees of all the fingerprints in the fingerprint set each are less than the second threshold and when the fingerprint set includes a fingerprint whose matching degree is less than the second threshold and greater than the first threshold.

That a determining unit determines, for each fingerprint in the fingerprint set, a degree of matching between the fingerprint and the positioning data based on a second signal strength and a first signal strength of each positioning MAC address included in the fingerprint is specifically: generating a first AP relationship pair set based on an AP relationship pair including any two APs in the positioning data; for each fingerprint in the fingerprint set, generating a second AP relationship pair set based on an AP relationship pair including two APs identified by any two positioning MAC addresses in the fingerprint; for each fingerprint in the fingerprint set, setting a first weight value for each AP relationship pair in the first AP relationship pair set based on the first signal strength of each positioning MAC address in the fingerprint, and setting a second weight value for each AP relationship pair in the second AP relationship pair set based on the second signal strength of each positioning MAC address in the fingerprint; and calculating the degree of matching between the fingerprint and the positioning data based on whether the first weight value is equal to the second weight value of each AP relationship pair in the second AP relationship pair set corresponding to the fingerprint.

That a determining unit determines, for each fingerprint in the fingerprint set, a degree of matching between the fingerprint and the positioning data based on a second signal strength and a first signal strength of each positioning MAC address included in the fingerprint is specifically: for each fingerprint in the fingerprint set, setting a first weight value and a second weight value for each positioning MAC address respectively based on the first signal strength and the second signal strength of each positioning MAC address included in the fingerprint; and for each fingerprint in the fingerprint set, calculating the degree of matching between the fingerprint and the positioning data based on whether the first weight value and the second weight value of each positioning MAC address in the fingerprint are equal.

After the obtaining unit obtains the positioning data collected during positioning, and before the obtaining unit obtains the fingerprint set from the location database based on the positioning data, the apparatus further includes:

a deleting unit, configured to delete a positioning MAC address that is not in the location database and a first signal strength of the positioning MAC address from the positioning data.

For the data processing apparatus shown in FIG. 5, refer to a related implementation performed by the terminal in the data processing method shown in FIG. 4. Details are not described herein again.

Optionally, the data processing apparatus shown in FIG. 5 may be located in a terminal, or may be located in a server. If the data processing apparatus is located in the server, after obtaining the collected positioning data, the terminal further needs to report the collected positioning data to the server, and the server performs, by using the data processing apparatus, operations performed by the foregoing modules.

Figure 6:
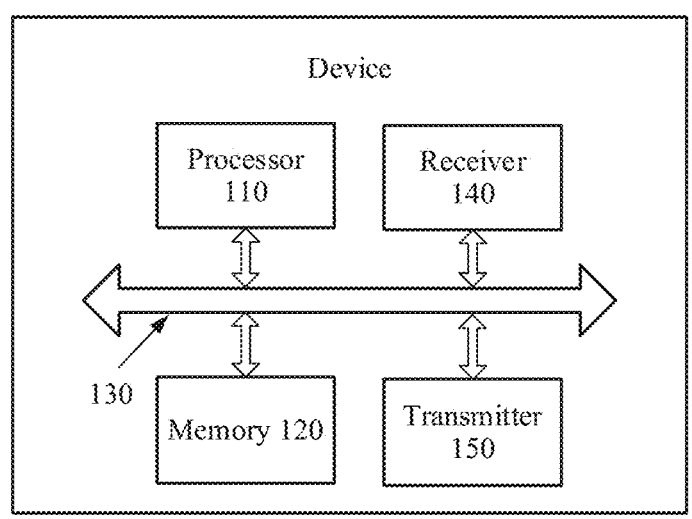
FIG. 6 is a schematic structural diagram of a device according to an embodiment of the present invention.

FIG. 6 is a schematic structural diagram of a device according to an embodiment of the present invention. The device shown in FIG. 6 may include a processor 110, a memory 120, a communications interface, and one or more programs. The processor is connected to the communications interface and the memory, the one or more programs are stored in the memory, and the processor is configured to invoke the program in the memory to perform related operations of the data processing method in FIG. 1 to FIG. 4.

Further, the communications interface may include a receiver 140 and a transmitter 150. Further, the device may further include a bus system 130. The processor 110, the memory 120, the receiver 140, and the transmitter 150 may be connected to each other by using the bus system 130.

The processor 110 is configured to execute an instruction stored in the memory 120, to control the receiver 140 to receive a signal and control the transmitter 150 to send a signal, to complete the steps of the terminal device in the foregoing method. The receiver 140 and the transmitter 150 may be a same physical entity or different physical entities. When being the same physical entity, the receiver and the transmitter may be collectively referred to as a transceiver. The memory 220 may be integrated into the processor 210, or may be separated from the processor 210.

In an implementation, it may be considered that functions of the receiver 140 and the transmitter 150 are implemented by using a transceiver circuit or a dedicated transceiver chip. It may be considered that the processor 110 is implemented by using a dedicated processing chip, processing circuit, or processor, or a general-purpose chip.

In another implementation, it may be considered that the device provided in this embodiment of this application is implemented by using a general-purpose computer. To be specific, program code for implementing functions of the processor 110, the receiver 140, and the transmitter 150 is stored in the memory, and a general-purpose processor implements the functions of the processor 110, the receiver 140, and the transmitter 150 by executing the code in the memory.

For concepts, explanations, detailed descriptions, and other steps related to the device and related to the technical solutions provided in this embodiment of this application, refer to related descriptions of the content in the foregoing method or another embodiment. Details are not described herein again.

Figure 7A:
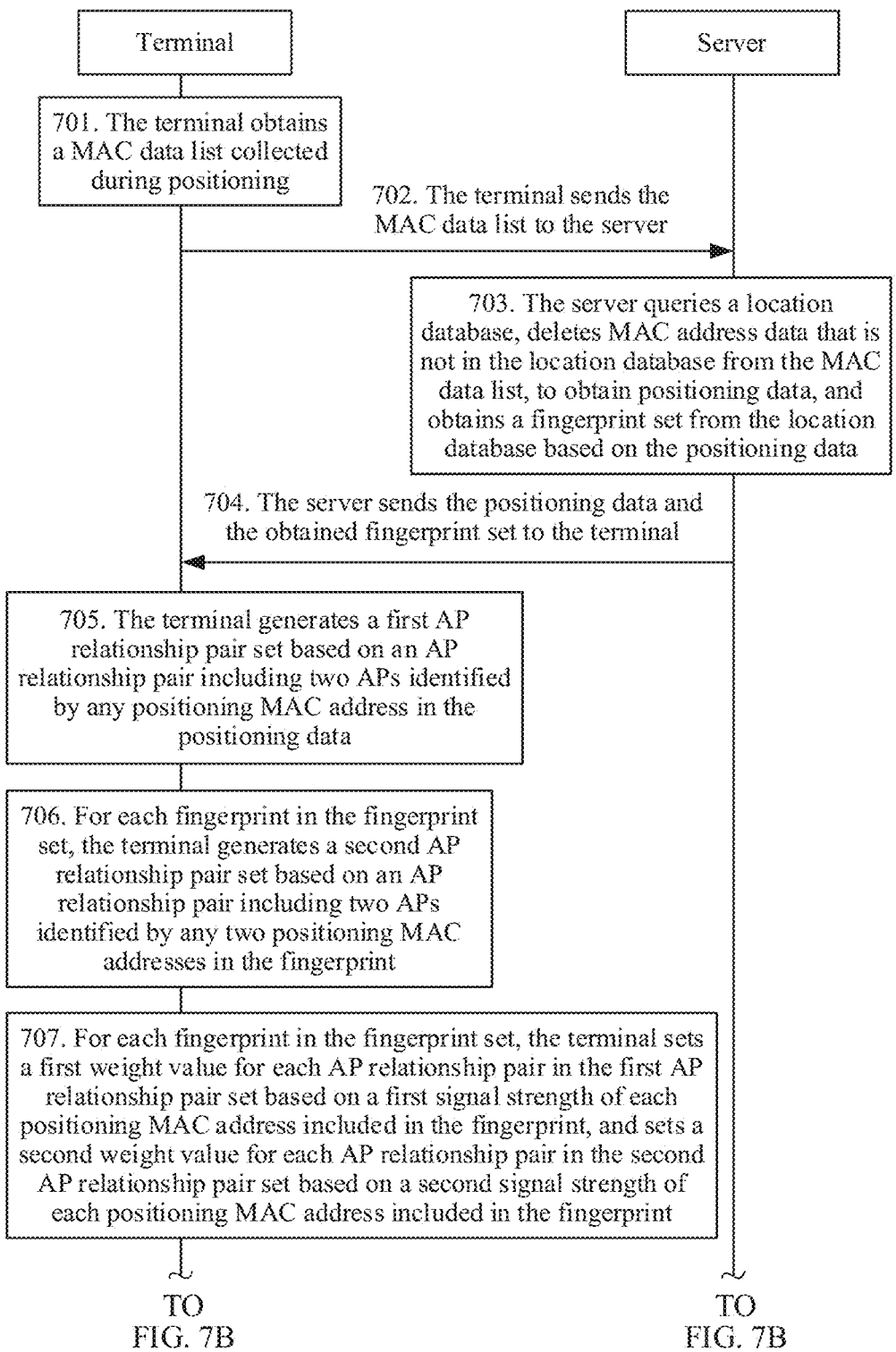

FIG. 7A and FIG. 7B are a schematic flowchart of a data processing system according to an embodiment of this application. The data processing system may be the system shown in FIG. 2. In other words, the system includes a terminal and a server. The data processing system shown in FIG. 7A and FIG. 7B is described by using online positioning as an example. The data processing system may include the following steps.

701. The terminal obtains a MAC data list collected during positioning.

702. The terminal sends the MAC data list to the server.

703. The server queries a location database, deletes MAC address data that is not in the location database from the MAC data list, to obtain positioning data, and obtains a fingerprint set from the location database based on the positioning data.

The positioning data includes a positioning MAC address and a signal strength of an AP identified by the positioning MAC address, and the signal strength is referred to as a first signal strength of the positioning MAC address. The fingerprint set includes at least one fingerprint, each fingerprint in the fingerprint set includes at least one positioning MAC address, and a signal strength that is of an AP identified by the positioning MAC address and that is in a fingerprint in which the AP is located is referred to as a second signal strength of the positioning MAC address.

704. The server sends the positioning data and the obtained fingerprint set to the terminal.

705. The terminal generates a first AP relationship pair set based on an AP relationship pair including two APs identified by any positioning MAC address in the positioning data.

706. For each fingerprint in the fingerprint set, the terminal generates a second AP relationship pair set based on an AP relationship pair including two APs identified by any two positioning MAC addresses in the fingerprint.

707. For each fingerprint in the fingerprint set, the terminal sets a first weight value for each AP relationship pair in the first AP relationship pair set based on the first signal strength of each positioning MAC address included in the fingerprint, and sets a second weight value for each AP relationship pair in the second AP relationship pair set based on the second signal strength of each positioning MAC address included in the fingerprint.

708. For each fingerprint in the fingerprint set, the terminal calculates a degree of matching between the fingerprint and the positioning data based on whether the specified first weight value and the specified second weight value of each AP relationship pair are equal.

709. When matching degrees of all fingerprints in the fingerprint set each are less than a first threshold, the terminal determines that an AP included in the positioning data moves, and notifies the server of the moving.

710. The server deletes the fingerprint from the location database.

Optionally, the terminal may further notify a user that the positioning data includes an AP that has moved or an AP that has migrated.

Optionally, the server may further notify a database creation training server of the deletion event, so that the database creation training server deletes positioning MAC data included in the fingerprint from the database creation training server, and transfers the positioning MAC data to an abnormal MAC list.

711. When determining that there is a fingerprint whose matching degree is greater than a second threshold, the terminal calculates a location by using the fingerprint whose matching degree is greater than the second threshold and the positioning data.

The second threshold is greater than the first threshold.

712. When determining that a largest matching degree in the matching degrees of all the fingerprints in the fingerprint set is less than the second threshold and greater than the first threshold, the terminal generates an alarm event for the positioning data and sends the alarm event to the server.

Optionally, in step 712, when the matching degrees of all the fingerprints in the fingerprint set each are less than the second threshold and when the fingerprint set includes a fingerprint whose matching degree is less than the second threshold and greater than the first threshold, the terminal may further generate an alarm event for the positioning data and the fingerprint set, and send the alarm event to the server.

For related operations of step 701 to step 702, refer to related descriptions in the embodiment in FIG. 4. Details are not described herein again.

In some embodiments, for a location database in a radio map scenario, when querying the location database to obtain the positioning data, the server may reconstruct data of a positioning MAC scatter point into a fingerprint and return the fingerprint to the terminal; or the server may reconstruct a positioning MAC scatter point into a fingerprint based on longitude and latitude coordinates, and return the fingerprint to the terminal.

In some other embodiments, related operations of the terminal in step 705 to step 712 may be performed by the server. The server only needs to return a result indicating whether the positioning data is migrated, or the location determined by using the positioning data and the fingerprint whose matching degree is greater than the second threshold, or the generated alarm event to the terminal.

An embodiment of this application further provides a computer storage medium. The computer storage medium is configured to store a computer software instruction used by the foregoing network device, and the computer software instruction includes a program designed to perform the data processing method according to FIG. 1 to FIG. 4.

It should be understood that, in the embodiments of this application, the processor may be a central processing unit (Central Processing Unit, "CPU" for short), or the processor may be another general-purpose processor, a digital signal processor (DSP), an application-specific integrated circuit (ASIC), a field programmable gate array (FPGA) or another programmable logic device, a discrete gate or a transistor logic device, a discrete hardware component, or the like. The general-purpose processor may be a microprocessor, or the processor may be any conventional processor or the like.

The memory may include a read-only memory and a random access memory, and provide an instruction and data for the processor. A part of the memory may further include a non-volatile random access memory.

The bus system may further include a power bus, a control bus, a status signal bus, and the like, in addition to a data bus. However, for clear description, various types of buses in the figure are marked as the bus system.

In an implementation process, steps in the foregoing methods can be implemented by using a hardware integrated logic circuit in the processor, or by using instructions in a form of software. The steps of the method disclosed with reference to the embodiments of this application may be directly performed by a hardware processor, or may be performed by using a combination of hardware in the processor and a software module. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor. To avoid repetition, details are not described herein again.

It should be further understood that the numbers such as first, second, third, and fourth included in this specification are merely for distinguishing purposes for ease of description, and are not intended to limit the scope of the embodiments of the present invention.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in various embodiments of this application. The execution sequences of the processes should be determined based on functions and internal logic of the processes, and should not be construed as any limitation on the implementation processes of the embodiments of the present invention.

A person of ordinary skill in the art may be aware that, various illustrative logical blocks (illustrative logical block) and steps (step) described in the embodiments disclosed in this specification can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed systems, apparatuses, and methods may be implemented in other manners. For example, the described apparatus embodiments are merely examples. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of the present invention may be integrated into one processing unit, or each of the units may exist alone physically, or two or more units are integrated into one unit.

All or some of the foregoing embodiments may be implemented by using software, hardware, firmware, or any combination thereof. When software is used to implement the embodiments, the embodiments may be implemented all or partially in a form of a computer program product. The computer program product includes one or more computer instructions. When the computer program instructions are loaded and executed on the computer, the procedure or functions according to the embodiments of the present invention are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, a magnetic tape), or an optical medium (for example, a DVD), a semiconductor medium (for example, a solid-state drive Solid State Disk, (SSD)), or the like.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A data processing method, comprising:
obtaining positioning data collected during positioning of a terminal, wherein the positioning data comprises a first positioning media access control (MAC) address and a first signal strength of an access point (AP), and wherein the first signal strength that is of the AP identified by the first positioning MAC address;
obtaining a fingerprint set from a location database based on the positioning data, wherein the fingerprint set comprises at least one fingerprint, and wherein each fingerprint in the fingerprint set comprises at least one second positioning MAC address, and a second signal strength that is of an AP identified by the at least one second positioning MAC address;
determining, for each fingerprint in the fingerprint set, a matching degree between the fingerprint and the positioning data based on a corresponding second signal strength and a corresponding first signal strength of each second positioning MAC address in the respective fingerprint;

determining that the AP comprised in the positioning data has moved when each of the matching degrees is less than a first threshold; and generating, in response to identifying that each of the matching degrees is less than a second threshold and that the fingerprint set comprises a second fingerprint with a second matching degree is less than the second threshold and greater than the first threshold, an alarm event for the positioning data.

2. The data processing method of claim 1, wherein determining the matching degree between the fingerprint and the positioning data further comprises:

generating a first AP relationship pair set based on an AP relationship pair comprising APs identified by any two first positioning MAC addresses in the positioning data;

generating, for each fingerprint in the fingerprint set, a second AP relationship pair set based on an AP relationship pair comprising APs identified by any two second positioning MAC addresses in the fingerprint;

setting, for each fingerprint in the fingerprint set, a first weight value for each AP relationship pair in the first AP relationship pair set based on the first signal strength of each second positioning MAC address in the fingerprint;

setting, for each fingerprint in the fingerprint set, a second weight value for each AP relationship pair in the second AP relationship pair set based on the second signal strength of each second positioning MAC address in the fingerprint; and calculating, for each fingerprint in the fingerprint set, the matching degree between the fingerprint and the positioning data based on whether the first weight value is equal to the second weight value of each AP relationship pair in the second AP relationship pair set.

3. The data processing method of claim 1, further comprising calculating, in response to identifying that the fingerprint set comprises a second fingerprint with a second matching degree is greater than a second threshold, a location by using the fingerprint whose matching degree is greater than the second threshold, wherein the second threshold is greater than the first threshold.

4. The data processing method of claim 1, wherein the fingerprint set comprises a set of fingerprints comprising a first MAC address in the location database, and wherein the first MAC address comprises a third positioning MAC address with a highest first signal strength in the positioning data.

5. The data processing method of claim 1, wherein the fingerprint set comprises a set of fingerprints comprising a second MAC address in the location database, and wherein the second MAC address comprises a third positioning MAC address with a first signal strength greater than a signal strength threshold in the positioning data.

6. The data processing method of claim 1, wherein after obtaining the positioning data and before obtaining the fingerprint set, the data processing method further comprises deleting a third positioning MAC address that is not in the location database and a first signal strength of the third positioning MAC address from the positioning data.

7. An apparatus, comprising:
a memory configured to store instructions; and
a processor coupled to the memory, wherein the instructions cause the processor to be configured to:

obtain positioning data collected during positioning of a terminal, wherein the positioning data comprises a first positioning media access control (MAC) address and a first signal strength of an access point (AP), and wherein the first signal strength that is of the AP identified by the first positioning MAC address;

obtain a fingerprint set from a location database based on the positioning data, wherein the fingerprint set comprises at least one fingerprint, and wherein each fingerprint in the fingerprint set comprises at least one second positioning MAC address, and a second signal strength that is of an AP identified by the at least one second positioning MAC address;

determine, for each fingerprint in the fingerprint set, a matching degree between the fingerprint and the positioning data based on a corresponding second signal strength and a corresponding first signal strength of each positioning MAC address in the respective fingerprint;

determine that the AP comprised in the positioning data has moved when each of the matching degrees is less than a first threshold; and generate, in response to identifying that each of the matching degrees of all the fingerprints in the fingerprint set is less than a second threshold and that the fingerprint set comprises a second fingerprint with a second matching degree less than the second threshold and greater than the first threshold, an alarm event for the positioning data.

8. The apparatus of claim 7, wherein when determining the matching degree between the fingerprint and the positioning data, the instructions further cause the processor to be configured to:

generate a first AP relationship pair set based on an AP relationship pair comprising APs identified by any two first positioning MAC addresses in the positioning data;

generate, for each fingerprint in the fingerprint set, a second AP relationship pair set based on an AP relationship pair comprising APs identified by any two second positioning MAC addresses in the fingerprint;

set, for each fingerprint in the fingerprint set, a first weight value for each AP relationship pair in the first AP relationship pair set based on the first signal strength of each second positioning MAC address in the fingerprint;

set, for each fingerprint in the fingerprint set, a second weight value for each AP relationship pair in the second AP relationship pair set based on the second signal strength of each second positioning MAC address in the fingerprint; and calculate, for each fingerprint in the fingerprint set, the matching degree between the fingerprint and the positioning data based on whether the first weight value is equal to the second weight value of each AP relationship pair in the second AP relationship pair set.

9. The apparatus of claim 7, wherein the instructions further cause the processor to be configured to calculate, in response to identifying that the fingerprint set comprises a second fingerprint with a second matching degree greater than a second threshold, a location by using the fingerprint whose matching degree is greater than the second threshold, and wherein the second threshold is greater than the first threshold.

10. The apparatus of claim 7, wherein the fingerprint set comprises a set of fingerprints comprising a first MAC address in the location database, and wherein the first MAC address comprises a third positioning MAC address with a highest first signal strength in the positioning data.

11. The apparatus of claim 7, wherein the fingerprint set comprises a set of fingerprints comprising a second MAC address in the location database, and wherein the second MAC address comprises a third positioning MAC address with a first signal strength greater than a signal strength threshold in the positioning data.

12. The apparatus of claim 7, wherein after obtaining the positioning data and before obtaining the fingerprint set, the instructions further cause the processor to be configured to delete a third positioning MAC address that is not in the location database and a first signal strength of the third positioning MAC address from the positioning data.

13. A computer program product comprising computer-executable instructions stored on a non-transitory computer-readable storage medium that, when executed by a processor, cause an apparatus to:
obtain positioning data collected during positioning of a terminal, wherein the positioning data comprises a first positioning media access control (MAC) address and a first signal strength of an access point (AP), and wherein the first signal strength of the AP that is identified by the first positioning MAC address;
obtain a fingerprint set from a location database based on the positioning data, wherein the fingerprint set comprises at least one fingerprint, and wherein each fingerprint in the fingerprint set comprises at least one second positioning MAC address, and a second signal strength that is of an AP identified by the at least one second positioning MAC address;
determine, for each fingerprint in the fingerprint set, a matching degree between the fingerprint and the positioning data based on a corresponding second signal strength and a corresponding first signal strength of each positioning MAC address in the respective fingerprint; and
determine that the AP comprised in the positioning data has moved when each of matching degrees of all fingerprints in the fingerprint set is less than a first threshold,
wherein determining the matching degree further comprises:
generating a first AP relationship pair set based on an AP relationship pair comprising APs identified by any two first positioning MAC addresses in the positioning data;
generating, for each fingerprint in the fingerprint set, a second AP relationship pair set based on an AP relationship pair comprising APs identified by any two second positioning MAC addresses in the fingerprint;
setting, for each fingerprint in the fingerprint set, a first weight value for each AP relationship pair in the first AP relationship pair set based on the first signal strength of each second positioning MAC address in the fingerprint;
setting, for each fingerprint in the fingerprint set, a second weight value for each AP relationship pair in the second AP relationship pair set based on the second signal strength of each second positioning MAC address in the fingerprint; and
calculating, for each fingerprint in the fingerprint set, the matching degree between the fingerprint and the positioning data based on whether the first weight value is equal to the second weight value of each AP relationship pair in the second AP relationship pair set,
wherein the computer-executable instructions further cause the apparatus to generate, in response to identifying that each of the matching degrees of all the fingerprints in the fingerprint set is less than a second threshold and that the fingerprint set comprises a second fingerprint with a second matching degree less than the second threshold and greater than the first threshold, an alarm event for the positioning data.

14. The computer program product of claim 13, wherein the computer-executable instructions further cause the apparatus to calculate, in response to identifying that the fingerprint set comprises a second fingerprint with a second matching degree greater than a second threshold, a location by using the fingerprint whose matching degree is greater than the second threshold, and wherein the second threshold is greater than the first threshold.

15. The computer program product of claim 13, wherein the fingerprint set comprises a set of fingerprints comprising a first MAC address in the location database, and wherein the first MAC address comprises a third positioning MAC address with a highest first signal strength in the positioning data.

16. The computer program product of claim 13, wherein the fingerprint set comprises a set of fingerprints comprising a second MAC address in the location database, and wherein the second MAC address comprises a third positioning MAC address with a first signal strength greater than a signal strength threshold in the positioning data.

17. The computer program product of claim 13, wherein after obtaining the positioning data and before obtaining the fingerprint set, the computer-executable instructions further cause the apparatus to delete a third positioning MAC address that is not in the location database and a first signal strength of the third positioning MAC address from the positioning data.

18. The data processing method of claim 1, wherein the location database is obtained from crowdsourcing data.

19. The apparatus of claim 7, wherein the location database is obtained from crowdsourcing data.

20. The computer program product of claim 13, wherein the location database is obtained from crowdsourcing data.

* * * * *